United States Patent [19]

Pickel

[11] 4,276,965
[45] Jul. 7, 1981

[54] FLOATING CALIPER SPOT TYPE DISC BRAKE

[75] Inventor: Hajo Pickel, Kelkheim, Fed. Rep. of Germany

[73] Assignee: ITT Industries, Inc., New York, N.Y.

[21] Appl. No.: 66,960

[22] Filed: Aug. 16, 1979

[30] Foreign Application Priority Data

Sep. 16, 1978 [DE] Fed. Rep. of Germany ....... 2840374

[51] Int. Cl.³ ............................................ F16D 65/02
[52] U.S. Cl. ................................................. 188/73.5
[58] Field of Search ...................... 188/72.4, 73.3–73.6

[56] References Cited

U.S. PATENT DOCUMENTS 3,990,545 11/1976 Hoffmann et al. ............. 188/73.5 X
4,072,215 2/1978 Burgdorf et al. ............... 188/73.5 X

FOREIGN PATENT DOCUMENTS 86075 10/1965 France ..................... 188/73.5
Ad.86075

Primary Examiner—Duane A. Reger
Attorney, Agent, or Firm—John T. O'Halloran; Alfred C. Hill

[57] ABSTRACT

A spring clamping the brake caliper relative to the brake support member radially includes a middle section fastened to the end surface of the caliper remote from the actuating device and two spring arms extending substantially parallel to the brake disc being in slidable abutting engagement with the arms of the support member.

15 Claims, 6 Drawing Figures

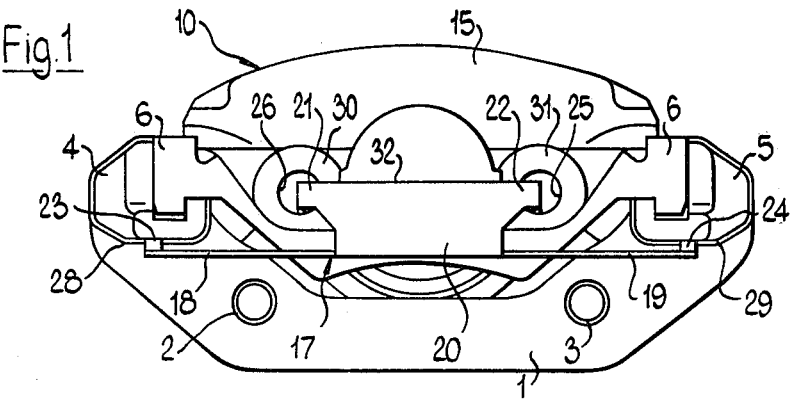
Fig. 1
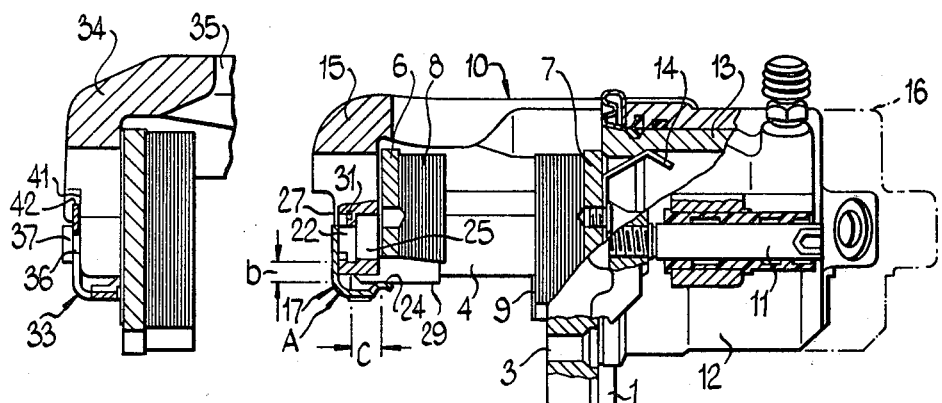
Fig. 5
Fig. 2
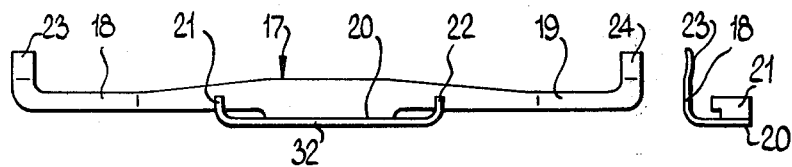
Fig. 3
Fig. 4
Fig. 6

FLOATING CALIPER SPOT TYPE DISC BRAKE

BACKGROUND OF THE INVENTION

This invention relates to a floating caliper spot type disc brake, in particular for automotive vehicles, with a brake caliper axially slidably guided on a brake support member and arranged between arms of the brake support member, and a spring clamping the brake caliper relative to the brake support member radially.

In floating caliper spot type disc brakes, springs for clamping a brake caliper relative to a brake support member are necessary in order to maintain the guides of the brake caliper free from clearance and to thus prevent rattling of the brake caliper in its guides, for example, when the vehicle is subject to vibrations on an uneven road surface.

In a known floating caliper spot type disc brake of the type referred to, such as disclosed in French Pat. No. 1,348,468, the brake caliper rests on the backing plates of the brake shoes located on both sides of the brake disc, with the brake shoes being in turn guided on the arms of the brake support member fitting over the brake disc. The brake caliper is held in position by means of a leaf spring fitting over the radial outer edge of the brake caliper and having its ends detachably fastened to the arms of the brake support member. A disadvantage in this known floating caliper spot type disc brake is that the leaf spring is situated between the outer periphery of the brake disc and the inner edge of the vehicle wheel, that is at a location where the mounting space available for the brake caliper is, as a rule, very small. Another disadvantage in this known brake is that the brake caliper is displaced relative to the leaf spring as the brake shoes' wear increases progressively, so that the position of the center of gravity of the caliper relative to the plane of action of the leaf spring becomes progressively disadvantageous. Therefore, the leaf spring is required to have an increased initial preload to compensate for this disadvantage.

SUMMARY OF THE INVENTION

It is an object of the present invention to provide a floating caliper spot type disc brake of the type referred to above which utilizes the mounting space between the vehicle wheel and the brake disc for the spring advantageously, whose spring action is independent of the state of wear of the brake shoes and which affords particular ease of assembly.

A feature of the present invention is the provision of a floating caliper spot type disc brake comprising a brake support member disposed substantially parallel to a brake disc, the support member having a pair of arms extending over the periphery of the disc; a brake caliper being disposed to embrace the disc and axially slidably guided on the support member and disposed between the pair of arms; and a spring clamping the caliper relative to the support member radially, the spring including a middle section fastened to an end surface of the caliper remote from an actuating device for the brake, and two spring arms extending substantial parallel to the discs in opposite directions from the middle section, each of the two spring arms being in slidable abutting engagement with a different one of the pair of arms of the support member.

The floating caliper spot type disc brake constructed in accordance with the principles of the present invention has the advantage of permitting the spring, which clamps the brake caliper relative to the brake support member, to be situated on the brake caliper at a location where in the majority of assembly situations sufficient mounting space is available. Further, the fastening of the spring to the brake caliper itself results in the points of application of the spring on the brake support member maintaining their positions in relation to the brake caliper under all operating states, so that the spring action can be coordinated optimally with the forces acting on the brake caliper. Moreover, the position of the spring on the end surface of the brake caliper affords ease of assembly and disassembly of the spring, since it is readily accessible for being fastened after removal of the vehicle wheel with the brake fitted to the vehicle.

The present invention permits the assembly of the spring to be simplified still further by the retaining spring being hooked on the brake caliper detachably and being secured against automatic disengagement by its spring load. In this design, the spring can be disengaged without special tools by bending the spring manually.

To fasten the spring to the brake caliper, it will be an advantage to provide an axially extending projection which has an enlarged head on which the spring is hooked. In another advantageous embodiment of this invention, the end surface of the brake caliper includes a bore with a recess, and the spring has a hook extending into the bore, with the hook's end engaging into the recess. This type of fastening of the spring requires no projecting parts on the brake caliper and, accordingly, necessitates little space. In addition, it permits economy of manufacture.

In a preferred embodiment of this invention, the middle section of the spring bears axially against the brake caliper at a radial distance from where it is fastened. By this means, the fastening of the spring on the brake caliper becomes resistant to bending in an axial direction, without the fastening means themselves being resistant to bending. The flexural strength of the fastening has the advantage of the spring following directly the brake-applying movements of the brake caliper and prevents the spring from assuming an inclined position causing uncontrolled force impact in the brake-release direction.

For the effect of the spring and the design of the brake it is further advantageous if the bearing areas of the spring arms on the arms of the brake support member are at a smaller distance from the brake disc than the fastening of the spring on the brake caliper. From this results a torque, which is caused by the spring force, at the fastening point of the spring and ensures a stable position of the spring. The bearing areas of the spring arms lie preferably in the plane of the backing plate of the brake shoe immediately adjacent the spring. Thereby, the length of the arms of brake support member may be minimized, and the position of the spring force in this spring arrangement is particularly advantageous with the brake caliper being guided on the backing plate of the brake shoe.

In another advantageous embodiment of this invention, the spring remains clamped in the same sense relative to the brake caliper both in the presence of a brake-applying and a brake-release movement of the brake caliper, so that its friction contact relative to the brake support member counteracts axial movements of the brake caliper in both directions of movement.

For this purpose, it is proposed to arrange for the connecting line of the bearing areas of the spring arms on the brake support member to be closer to the brake disc than the point of fastening of the spring on the brake caliper by a radial amount, and to arrange for the axial distance between the connecting line of the bearing areas and the point of fastening of the spring to be greater than the product of the radial amount multiplied by the coefficient of friction occurring between the spring arms and the brake support member.

In another proposal of the invention, the manufacture of a spring for the floating caliper spot type disc brake of the present invention can be made easy by the provision of a spring leaf forming the spring arms, with the middle section thereof including a vertically bent, substantially rectangular leg onto whose free edges hooks are formed for fastening the spring to the brake caliper. For fastening of the spring, it is also advantageous to bend the hooks vertically out of the plane of the leg in the same direction as the spring leaf, with the bending edges of the spring leaf and of the hooks being normal to each other. The ends of the spring leaf may also be bent vertically towards the brake disc in order for the spring arms to abut the arms of the brake support member laterally adjacent the backing plate of the brake shoe lying in the immediate neighborhood. The bent ends also result in an increased resilience of the spring because a torsional stress is added to the bending stress of the spring arms.

In order to obtain a defined point of application of force having a low amount of friction and to obviate the need for special treatment of the arms of the brake support member, the abutment surfaces at the ends of the spring leaf may be curved.

BRIEF DESCRIPTION OF THE DRAWING

Above-mentioned and other features and objects of this invention will become more apparent by reference to the following description taken in conjunction with the accompanying drawing, in which:

FIG. 1 is a side elevation of a floating caliper spot type disc brake in accordance with the principles of the present invention, viewed from the side remote from the actuating device;

FIG. 2 is a side elevation, partially in section, of the brake of FIG. 1;

FIG. 3 is a top plan view of the spring of the brake of FIGS. 1 and 2;

FIG. 4 is a side elevation of the spring of the brake of FIGS. 1 and 2;

FIG. 5 is a view of the end section of a second embodiment of a brake caliper in accordance with the principles of the present invention with a spring fastened to a projection; and FIG. 6 is a view of a spring for the brake caliper of FIG. 5.

DESCRIPTION OF THE PREFERRED EMBODIMENTS

The floating caliper spot type disc brake illustrated in FIG. 1 and 2 comprises a brake support member 1 extending substantially parallel with a brake disc (not shown) and being adapted to be mounted on a wheel carrier or a steering knuckle of a vehicle by means of bolts that can be screwed into threaded bores 2 and 3. Brake support member 1 includes arms 4 and 5 extending over the periphery of the brake disc. Arms 4 and 5 each have a guide groove engaged by the ends of the backing plates 6 and 7 of the brake shoes 8 and 9 which are arranged on both sides of the brake disc.

Brake shoes 8 and 9 are actuated by a brake caliper 10 which is disposed between arms 4 and 5 of brake support member 1 and extends radially from the outside across brake shoes 8 and 9 and the periphery of the brake disc. Brake caliper 10 is axially slidably guided on two bolts 11 bolted tightly to brake support member 1 and is in abutment with the radially outwardly extended ends of backing plate 6. Bolts 11 are arranged on either side of the brake cylinder 12 forming the one leg of the brake caliper and extend in parallel with the cylinder axis. The brake is applied by means of a brake piston 13 which is detachably connected with brake shoe 9 in the manner of a snap fastener by means of a spring clip 14 secured to the rear side of backing plate 7. Backing plate 6 of brake shoe 8 is in direct abutment with the leg 15 of brake caliper 10.

When the brake is applied, brake piston 13 causes displacement of brake shoe 9 to the left as illustrated in FIG. 2, until brake shoe 9 engages the friction surface of the brake disc after having overcome the brake clearance. Then the reaction force acting on brake cylinder 12 shifts brake caliper 10 to the right as a result of which brake shoe 8 engages the brake disc, too. In the event of wear at the brake shoes, the amount of displacement of brake caliper 10 to the right increases progressively, while brake piston 13 travels out of the bore of brake cylinder 12. The maximum amount of displacement of brake caliper 10 which the illustrated brake allows is shown by dot-dash line 16.

In order to urge brake caliper 10 and, via brake caliper 10, backing plate 6 of brake shoe 8 into abutment with the guiding surfaces on arms 4 and 5 of brake support member 1 with such a force that the resilient movements of the steering knuckle or of the wheel carrier do not result in lifting of brake caliper 10 off its guiding surfaces, a spring 17 is provided which is fastened to leg 15 of brake caliper 10.

Spring 17 which is shown in detail in FIGS. 3 and 4 comprises a spring leaf cut out of a plane spring plate and forming the spring arms 18 and 19, with the spring leaf's middle section including a substantially rectangular leg 20 bent to form right angles and having hooks 21 and 22 formed at its free edges. Hooks 21 and 22 in turn are bent at right angles to leg 20, with their bending edges extending normal to the spring leaf. The ends of spring arms 18 and 19 are bent in the same direction as hooks 21 and 22, and their ends include abutment surfaces 23 and 24 which are curved towards the hooks.

To fasten spring 17 to leg 15, the latter includes bores 25 and 26 into which annular grooves 27 are cut in. The ends of hooks 21 and 22 engage annular grooves 27 and are held in position by the preload of spring 17 which with its abutment surfaces 23 and 24 bears against the surfaces 28 and 29 of arms 4 and 5 of brake support member 1, which latter surfaces are adjacent the brake disc. Spring 17 can be fastened and removed by hand simply by pressing leg 20 upwards in the direction of arrow A (FIG. 2).

As a result of the bent ends of spring arms 18 and 19, the bearing areas of the spring arms on the arms of the brake caliper are at an axial distance "a" from the point of fastening of spring 17 to brake caliper 10. Therefore, the spring force tends to twist spring 17 in a clockwise direction, when viewed with reference to FIG. 2. To prevent this, leg 15 includes abutment surfaces 30 and 31 against which the upper edge 32 of leg 20 bears, and hooks 21 and 22 are at a radial distance "b" from the area of contact between abutment surfaces 23 and 24 and surfaces 28 and 29. In order to ensure that upper edge 32 remains in abutment with abutment surfaces 30 and 31 when brake caliper 10 moves in the brake-release direction, distance "a" of spring 17 is greater than the product of distance "b" multiplied by the coefficient of friction between abutment surfaces 23 and 24 of spring 17 and surfaces 28 and 29 on arms 4,5.

Spring 33 illustrated in FIGS. 5 and 6 distinguishes from spring 17 so far described essentially only by the different design of the fastening of the spring to the leg of the brake caliper. Instead of bores, the leg 34, illustrated in FIG. 5, of a brake caliper 35 includes projections 36 having an enlarged head 37. Formed in rectangular leg 38 of spring 33 are appropriate hooks 39 and 40 lying in the plane of leg 38 and having an opening corresponding to the diameter of projections 36.

After spring 33 is hooked into leg 34, hooks 39 and 40 embrace projections 36 and bear axially against their heads 37. In addition, leg 34 includes an abutment surface 41 for the upper edge 42 of leg 38, so that the torque caused by the load of spring 33 can be taken up effectively.

While I have described above the principles of my invention in connection with specific apparatus it is to be clearly understood that this description is made only by way of example and not as a limitation to the scope of my invention as set forth in the objects thereof and in the accompanying claims.

I claim:

1. A floating caliper spot type disc brake comprising:
   a brake support member disposed substantially parallel to a brake disc, said support member having a pair of arms extending over the periphery of said disc;
   a brake caliper being disposed to embrace said disc and axially slidably guided on said support member and disposed between said pair of arms; and
   a spring clamping said caliper relative to said support member radially, said spring including
   a middle section fastened to an end surface of said caliper parallel to said disc and remote from an actuating device for said brake, and
   two spring arms extending substantial parallel to said discs in opposite directions from said middle section, each of said two spring arms being in slidable abutting engagement with a different one of said pair of arms of said support member.

2. A disc brake according to claim 1, wherein said middle section is detachably hooked to said end surface of said caliper and secured against disengagement therefrom by the preload of said spring.

3. A disc brake according to claim 2, wherein said end surface of said caliper includes
   at least one axially extending projection having an enlarged head, and said middle section includes
   a hook to engage said projection behind said head.

4. A disc brake according to claim 2, wherein said end surface of said caliper includes
   at least one axial bore having an annular groove, and
said middle section includes
   a hook extending into said bore with the free end of said hook engaging said groove.

5. A disc brake according to claim 1, wherein said middle section is fastened to said end surface of said caliper at a given point and said middle section bears axially against said end surface of said caliper at a radial distance spaced from said given point.

6. A disc brake according to claim 5, wherein each of said two spring arms bear upon their associated ones of said pair of arms in a given bearing areas, said given bearing areas being disposed at a smaller distance from said disc than said given point.

7. A disc brake according to claim 6, wherein said given bearing areas lie in the plane of a backing plate of a brake shoe remote from said actuating device.

8. A disc brake according to claim 6, wherein said given bearing areas are closer to the axis of said disc than said given point by a radial amount "b", and
the axial distance "a" between said given bearing areas and said given point is greater than the product of said radial amount "b" multiplied by the coefficient of friction between said two spring arms and said pair of arms.

9. A disc brake according to claim 1, wherein said middle section includes
   a substantially rectangular leg disposed perpendicular to the plane of said two spring arms extending radially outward therefrom, and a pair of hooks formed on the free edge of said leg for fastening said middle section to said end surface of said caliper.

10. A disc brake according to claim 9, wherein said pair of hooks are bent out of the plane of said leg toward said disc.

11. A disc brake according to claim 10, wherein the ends of said two spring arms remote from said leg are bent toward said disc.

12. A disc brake according to claim 11, wherein the ends of said two spring arms remote from said leg are further curved toward the axis of said disc.

13. A disc brake according to claim 9, wherein said pair of hook are in the plane of said leg.

14. A disc brake according to claim 13, wherein the ends of said two spring arms remote from said leg are bent toward said disc.

15. A disc brake according to claim 14, wherein the ends of said two spring arms remote from said leg are further curved toward the axis of said disc.

* * * * *